United States Patent
Iwanaga et al.

(10) Patent No.: US 8,026,000 B2
(45) Date of Patent: Sep. 27, 2011

(54) NONAQUEOUS ELECTROLYTE SECONDARY BATTERY, NONAQUEOUS ELECTROLYTE, AND CHARGING METHOD THEREFOR

(75) Inventors: Masato Iwanaga, Itano-gun (JP); Yukihiro Oki, Tokushima (JP); Koji Abe, Ube (JP); Kazuhiro Miyoshi, Ube (JP)

(73) Assignees: Sanyo Electric Co., Ltd., Moriguchi-shi (JP); UBE Industries, Ltd., Yamaguchi (JP)

( * ) Notice: Subject to any disclaimer, the term of this patent is extended or adjusted under 35 U.S.C. 154(b) by 221 days.

(21) Appl. No.: 11/656,486

(22) Filed: Jan. 23, 2007

(65) Prior Publication Data
US 2007/0172730 A1    Jul. 26, 2007

(30) Foreign Application Priority Data
Jan. 26, 2006   (JP) .................................. 2006-017286

(51) Int. Cl.
*H01M 6/04* (2006.01)
(52) U.S. Cl. ........ 429/199; 429/200; 429/334; 429/342; 429/330; 429/323; 429/231.3; 429/231.1; 429/231.6; 429/224; 429/223; 429/218.1; 252/62.2
(58) Field of Classification Search .................. 429/199, 429/188, 324, 326, 330, 200, 231.3, 231.1, 429/231.6, 334, 342, 323, 224, 223, 218.1; 252/62.2
See application file for complete search history.

(56) References Cited

U.S. PATENT DOCUMENTS

| | | | |
|---|---|---|---|
| 7,261,975 B2 * | 8/2007 | Abe et al. ...................... | 429/199 |
| 7,297,442 B2 * | 11/2007 | Abe et al. ...................... | 429/199 |
| 7,438,991 B2 * | 10/2008 | Nishida et al. ............. | 429/231.3 |
| 7,754,380 B2 * | 7/2010 | Abe et al. ...................... | 429/199 |
| 2002/0110735 A1 | 8/2002 | Farnham et al. | |
| 2005/0255384 A1 | 11/2005 | Abe et al. | |
| 2006/0199077 A1 * | 9/2006 | Iwanaga et al. ............. | 429/231.3 |
| 2007/0207383 A1 | 9/2007 | Ohzuku et al. | |

FOREIGN PATENT DOCUMENTS

| | | |
|---|---|---|
| CN | 1433098 A | 7/2003 |
| CN | 1653642 A | 8/2005 |
| JP | 2003-272700 A | 9/2003 |
| JP | 2004-214139 A | 7/2004 |
| JP | 2004-519829 A | 7/2004 |
| JP | 2004-349131 A | 12/2004 |
| JP | 2005-317499 A | 11/2005 |
| WO | WO 2005029631 * | 3/2005 |
| WO | WO 2006077763 * | 7/2006 |

* cited by examiner

*Primary Examiner* — Laura Weiner
(74) *Attorney, Agent, or Firm* — Westerman, Hattori, Daniels & Adrian, LLP

(57) ABSTRACT

A nonaqueous electrolyte secondary battery of the invention has a positive electrode having a positive electrode active material, a negative electrode, and a nonaqueous electrolyte having electrolyte salt in a nonaqueous solvent. The electric potential of the positive electrode active material is 4.4 to 4.6 V relative to lithium, and the nonaqueous electrolyte contains a compound expressed by structural formula (I) below. The quantity of compound added is preferably 0.1% to 2% by mass. Also, the positive electrode active material preferably comprises a mixture of a lithium-cobalt composite oxide which is $LiCoO_2$ containing at least both zirconium and magnesium and a lithium-manganese-nickel composite oxide that has a layer structure and contains at least both manganese and nickel. Thanks to such structure, a nonaqueous electrolyte secondary battery can be provided that is charged to charging termination potential of 4.4 to 4.6 V relative to lithium and that has enhanced overcharging safety.

[Chemical Formula 1]

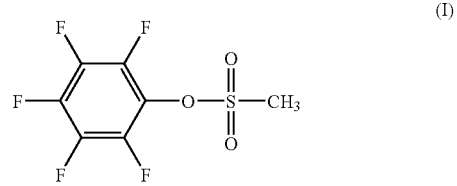

(I)

5 Claims, 1 Drawing Sheet

NONAQUEOUS ELECTROLYTE SECONDARY BATTERY, NONAQUEOUS ELECTROLYTE, AND CHARGING METHOD THEREFOR

FIELD OF THE INVENTION

The present invention relates to a nonaqueous electrolyte secondary battery that is charged with high voltage using a positive electrode active material that is charged to a charging terminal potential of 4.4 to 4.6 V relative to lithium, and to a charging method therefore. More particularly the present invention relates to a nonaqueous electrolyte secondary battery that is charged so as to have a charging terminal potential of 4.4 to 4.6 V relative to lithium, to a nonaqueous electrolyte, and to a charging method therefore, whereby safety in the event of overcharging is enhanced.

BACKGROUND OF THE INVENTION

With the rapid spread of portable electronic equipment, the specifications required of the batteries used in such equipment have become more stringent with every year, and there is particular requirement for batteries that are compact and thin, have high capacity and superior cycling characteristics, and give stable performance. In the field of secondary batteries, attention is focusing on nonaqueous electrolyte secondary batteries, which have high energy density compared with other batteries. These nonaqueous electrolyte secondary batteries are winning an increasingly large share of the secondary battery market.

In the equipment that uses such nonaqueous electrolyte secondary batteries, the space for housing the battery is often square (flattened box shape), so that the nonaqueous electrolyte secondary battery used is often formed so as to be square and to have its generating elements housed in a square case. An example of such a square nonaqueous electrolyte secondary battery will now be described using the accompanying drawing. FIG. 1 is a perspective view of a related art square nonaqueous electrolyte secondary battery, cut in the longitudinal direction. This nonaqueous electrolyte secondary battery 10 has a flattened electrode roll 14 in which a positive electrode plate 11 and a negative electrode plate 12 are rolled up with separators 13 interposed therebetween, and which is housed inside a square battery case 15. The battery case 15 is sealed by a sealing plate 16. The electrode roll 14 is rolled so that the positive electrode plate 11 is located on the outermost circumference and is exposed. The exposed, outer-circumference positive electrode plate 11 contacts directly, and thus is electrically coupled, with the inner surface of the battery case 15, which serves also as a positive electrode terminal. The negative electrode plate 12 is electrically coupled via a collector 19 to a negative electrode terminal 18 that is installed in the center of the sealing plate 16 with an insulator 17 interposed.

Since the battery case 15 is electrically coupled to the positive electrode plate 11, an insulating spacer 20 is inserted between the top end of the electrode roll 14 and the sealing plate 16, thereby electrically insulating the negative electrode plate 12 from the battery case 15, in order to prevent short circuiting between the negative electrode plate 12 and the battery case 15. To fabricate this square nonaqueous electrolyte secondary battery, the electrode roll 14 is inserted inside the battery case 15, then the sealing plate 16 is laser-welded over the open portion of the battery case 15, a nonaqueous electrolyte is poured in through an electrolyte pouring hole 21, and the electrolyte pouring hole 21 is sealed. Such a square nonaqueous electrolyte secondary battery wastes little space when used, and has the excellent advantages of high battery performance and high battery reliability.

The negative electrode active materials that are widely used in such square nonaqueous electrolyte secondary batteries are graphite, amorphous carbon and other carbonaceous materials, which, while having discharge potential rivaling that of lithium metals and lithium compounds, are not prone to dendrite growth, and therefore are high in safety and have superior initial efficiency and good potential flatness, as well as the excellent quality of high density.

As regards the positive electrode active materials, it is known that using a lithium composite oxide such as $LiCoO_2$, $LiNiO_2$, $LiMnO_2$, $LiMn_2O_4$ or $LiFeO_2$ in combination with a negative electrode constituted of a carbon material will give a high energy density 4 V class nonaqueous electrolyte secondary battery. Of these, $LiCoO_2$ is in frequent use because it provides various battery characteristics that are superior to those provided by the others.

For the nonaqueous electrolyte's nonaqueous solvent, use is made of carbonate, lactone, ether or ester, either singly or in a mixture of two or more. Of these, carbonate, which has high permittivity and high electrolyte ion conductivity, is in particularly frequent use.

In the event of overcharging or short-circuiting, the nonaqueous electrolyte of such nonaqueous electrolyte secondary batteries will reach high temperatures, which may result in generation of gas, or in swelling, ignition or explosion of the battery, etc. Accordingly, various additives are used simultaneously in combination with the nonaqueous electrolyte in order to assure safety. In JP-2004-214139-A for example, an electrolyte is disclosed in which a cyclic carbonate ester—an unsaturated hydrocarbon—is used as the nonaqueous solvent, and the additive that is added to assure safety in the event of overcharging contains at least one of the set composed of cyclohexylbenzene (CHB) and its derivatives, and at least one of the set composed of vinylene carbonate (VC), vinyl ethylene carbonate, and their derivatives.

Also, JP-2004-349131-A discloses a nonaqueous electrolyte to which an aromatic compound given by chemical formula (II) below is added as an additive for preventing overcharging.

[Chemical Formula 4]

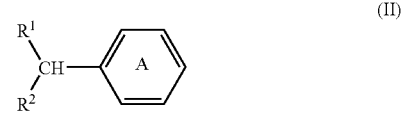

(II)

(where: $R^1$ and $R^2$ represent alkyl groups that are each separated and may have substitutional groups, or else $R^1$ and $R^2$ are bonded to each other and form hydrocarbon rings that may have substitutional groups. Ring A may have substitutional groups, and at least one of the carbon atoms adjacent to the carbon atom with which $R^1R^2CH$— bonds must have a substitutional group.) Also, JP-2003-272700-A discloses that when a pentafluorophenol compound given by chemical formula (III) below is added to the nonaqueous electrolyte, a nonaqueous electrolyte secondary battery is obtained that has superior cycling characteristics and charging/storing characteristics and whose 50-cycle discharge capacity maintenance rate is 88% or higher.

[Chemical Formula 5]

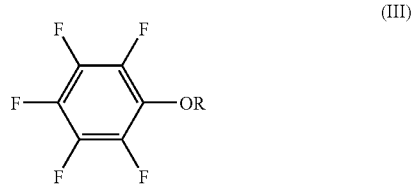

(where: R represents a substitutional group selected from a set composed of an alkyl carbonyl group with carbon number 2 to 12, an alkoxycarbonyl group with carbon number 2 to 12, an aryloxy carbonyl group with carbon number 7 to 18, and an alkane sulfonyl group with carbon number 1 to 12. At least one of the hydrogen atoms possessed by such a substitutional group may be substituted with a halogen atom or an aryl group with carbon number 6 to 18.)

Further, JP-A-2004-519829 discloses that when pentafluoroanisol or other fluorobenzene composition such as given by chemical formula (IV) below is added to the nonaqueous electrolyte, a nonaqueous electrolyte secondary battery is obtained that has a large reversible fraction and high cycling life.

[Chemical Formula 6]

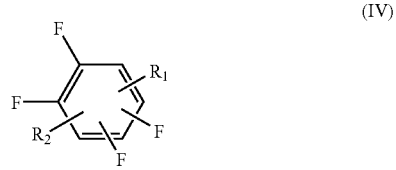

(where: $R_1$ and $R_2$ are separated and are hydrogen, halogen or another electron attracting withdrawing substituent or electron donating substituent. If $R_1$ is a non-halogen electron withdrawing substituent, $R_2$ must be an electron donating substituent.)

With the higher performance levels of portable equipment in recent years, further enhancement of secondary battery capacity has come to be expected of such nonaqueous electrolyte secondary batteries as well. Commonly known means of meeting such demand are to use higher-density electrode materials, to use thin films for the current collectors and separators, etc., and to use high charging voltage for the battery voltage. Of these means, the use of higher-density electrode materials and the use of thin films for the collectors and separators pose major problems of lowered productivity. By contrast, the use of high charging voltage for the battery voltage has minimal impact on productivity and enables high capacity to be achieved, and therefore will be an essential technique for the future development of high capacity batteries.

For example, in a nonaqueous electrolyte secondary battery that uses as its positive electrode active material a lithium-containing transition metal oxide such as the aforementioned lithium cobalt oxide $LiCoO_2$, and as its negative electrode active material a carbon material, the charging voltage is usually 4.1 to 4.2 V (the potential of the positive electrode active material being 4.2 to 4.3 V relative to lithium) when combined with the negative electrode active material of graphite or other carbon material. With such charging condition, only 50% to 60% of the theoretical capacity of the positive electrode can be utilized. Thus, if the charging voltage can be rendered higher, it will be possible to utilize 70% or more of the theoretical capacity of the positive electrode, thereby rendering the battery high-capacity and high-energy density.

In order to obtain a positive electrode active material that could stably achieve a high charging voltage, the present applicant engaged repeatedly in various investigations, and as a result developed a new nonaqueous electrolyte secondary battery that uses as its positive electrode active material a mixture of lithium cobalt oxide with a dissimilar element added, plus layered lithium manganese-nickel oxide, and that has been disclosed already in JP-2005-317499-A. With the positive electrode active material of the nonaqueous electrolyte secondary battery disclosed in JP-2005-317499-A, structural stability at high voltage (up to 4.5 V) is enhanced by the addition of at least Zr and Mg as dissimilar elements to the lithium cobalt oxide, and furthermore safety is assured through the presence of layered lithium manganese-nickel oxide, which has high thermal stability under high voltage, in the mixture. By combining a positive electrode that uses such positive electrode active material with a negative electrode having negative electrode active material constituted of carbon material, there is obtained a nonaqueous electrolyte secondary battery that is chargeable at high charging voltage of 4.3 to 4.5 V (charging termination potential being 4.4 to 4.6 V relative to lithium).

However, when the charging voltage is made high, as in the nonaqueous electrolyte secondary battery disclosed in JP-2005-317499-A, it is not possible to use overcharging protection additives such as biphenyl (BP) or CHB which have been widely used with related art 4.2 V charging voltage lithium batteries, because such additives would decompose and give rise to side reactions during normal use. Accordingly, in related art high charging voltage nonaqueous electrolyte secondary batteries, a heat-sensing protective element has been installed to assure safety in the event of overcharging.

In order to assure safety in the event of overcharging of the high charging voltage nonaqueous electrolyte secondary battery, it will be necessary to add a compound that has decomposition potential higher than that of BP or CHB, and that moreover has properties that will deactivate the battery before abnormality develops. Besides effects due to overcharging, it will also be important that no adverse effects are exerted on the battery characteristics during normal use.

SUMMARY

The present inventors has accomplished the present invention by discovering, as a result of a series of various experiments to obtain an additive possessing the foregoing properties, that such properties are possessed by pentafluorophenyl methanesulfonate, which is a compound expressed by structural formula (I) below, having a methanesulfonyloxy group in position 1 of a benzene ring, and having the hydrogen of positions 2 to 6 substituted with fluorine. Although JP-2003-272700-A and JP-A-2004-519829 disclose compounds that are analogous to the aforementioned compound (I), those compounds are not in any way presented therein as having the properties of an additive for overcharging protection. Nor is there any suggestion therein that those compounds could be used stably as additives for a nonaqueous electrolyte chargeable at high charging voltage of 4.4 to 4.6 V such as for the battery of the present invention.

[Chemical Formula 7]

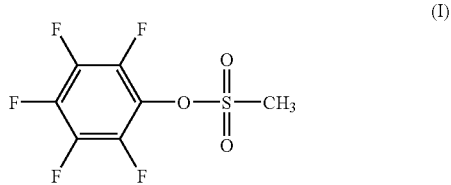

(I)

Accordingly, the present invention provides a nonaqueous electrolyte secondary battery that is charged to a charging termination potential of 4.4 to 4.6 V relative to lithium and has enhanced overcharging safety, together with a nonaqueous electrolyte and a charging method for such a battery.

The present invention provides the following features. According to a first aspect of the invention, a nonaqueous electrolyte secondary battery includes a positive electrode that has a positive electrode active material, a negative electrode, and a nonaqueous electrolyte that has electrolyte salt in a nonaqueous solvent. The electric potential of the positive electrode active material is 4.4 to 4.6 V relative to lithium, and the nonaqueous electrolyte contains a compound expressed by structural formula (I) below.

[Chemical Formula 8]

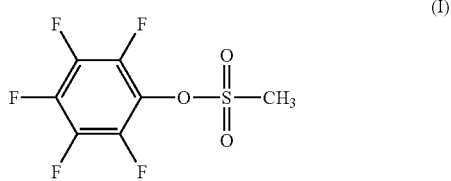

(I)

With the present invention, carbonate, lactone, ether, ester or the like can be used as the nonaqueous solvent (organic solvent) that is a constituent of the nonaqueous solvent electrolyte, or alternatively a mixture of two or more of these solvents can be used for such purpose. Of these, use will preferably be made of carbonate, lactone, ether, ketone, ester or the like; more preferably, carbonate will be used.

The following may be cited as specific instances: ethylene carbonate (EC), propylene carbonate, buthylene carbonate, fluoroethylene carbonate (FEC), 1,2-cyclohexyl carbonate (CHC), cyclopentanone, sulfolane, 3-methylsulfolane, 2,4-dimethylsulfolane, 3-methyl-1,3-oxazolidine-2-one, dimethyl carbonate (DMC), methyl ethyl carbonate (MEC), diethyl carbonate (DEC), methyl propyl carbonate, methyl butyl carbonate, ethyl propyl carbonate, ethyl butyl carbonate, dipropyl carbonate, γ-butyrolactone, γ-valerolactone, 1,2-dimethoxyethane, tetrahydrofuran, 2-methyl tetrahydrofuran, 1,3-dioxolan, methyl acetate, ethyl acetate, and 1,4-dioxane. With the present invention, a mixed solvent of EC plus DMC, MEC, DEC or other cyclic carbonate will preferably be used in the interest of raising the charging/discharging efficiency; of those, an asymmetric chain carbonate such as MEC will be preferable. Also, since EC is prone to oxidative decomposition at high potential, the EC content in the nonaqueous electrolyte will preferably be 5% to 25% by volume, or when DMC is used as the cyclic carbonate, 0% to 40% by volume, or when MEC is so used, 30% to 80% by volume, or when DEC is so used, 20% to 50% by volume.

As the solute for the nonaqueous electrolyte in the present invention, it will be possible to use the lithium salt that is commonly used as such solute in nonaqueous electrolyte secondary batteries. Examples of such lithium salt are $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and mixtures thereof. Of these, $LiPF_6$ (lithium hexafluorophosphate) will preferably be used. When charging with high charging voltage is performed, the aluminum that serves as the collector of the positive electrode might be prone to dissolve, but with $LiPF_6$ present, the $LiPF_6$ will decompose, with the result that a film will be formed on the surface of the aluminum and will curb dissolution of the aluminum. Therefore it will be preferable to use $LiPF_6$ as the lithium salt. The solute will preferably be dissolved in the nonaqueous solvent in the volume 0.5 to 2.0 mol/L.

It is preferable that the content of the compound given by structural formula (I) of the nonaqueous electrolyte secondary battery is 0.1% to 2% by mass of the nonaqueous electrolyte.

It is preferable that the positive electrode active material of the nonaqueous electrolyte secondary battery comprises a mixture of a lithium-cobalt composite oxide which is $LiCoO_2$ containing at least both zirconium and magnesium and a lithium-manganese-nickel composite oxide that has a layer structure and contains at least both manganese and nickel.

The lithium-cobalt composite oxide will preferably be $Li_aCo_{(1-x-y-z)}Zr_xMg_yM_zO_2$ (where $0<a\leq1.1$, $x>0$, $y>0$, $z\geq0$, $0<x+y+z\leq0.03$, M=Al, Ti, Sn). The addition of Zr and Mg as dissimilar metals will be essential. If the volume of these dissimilar metals that is added, combined with that of the Al, Ti and Sn, is too small, the cycling characteristic enhancement effects will be small. Conversely, if the volume added is too great, these dissimilar metals will not directly contribute to the electrode reactions, and so the initial capacity will fall. For the layered lithium-manganese-nickel composite oxide, $Li_bMn_sNi_tCo_uO_2$ with substantially equal Ni and Mn mole ratios (where $0<b\leq1.2$, $0<s\leq0.5$, $0<t\leq0.5$, $u\geq0$, $s+t+u=1$, $0.95\leq s/t\leq1.05$) will be preferable, and with the foregoing composition will yield an active material that has high thermal stability.

Also, the mixture ratio of the aforementioned lithium-cobalt composite oxide containing at least both zirconium and magnesium (active material A) with the layered lithium-manganese-nickel composite oxide (active material B) will preferably be in the range active material A: active material B=51:49 to 90:10 by mass, or more preferably 70:30 to 80:20. If active material A is less than 51%, the initial capacity will be small and the cycling characteristics and storage characteristics will deteriorate. If active material B is less than 10%, safety will decline.

It is preferable that the nonaqueous electrolyte of the nonaqueous electrolyte secondary battery further contains VC.

The present invention further provides the following features. According to the second aspect of the invention, a charging method for a nonaqueous electrolyte secondary battery which has a positive electrode having a positive electrode active material, a negative electrode, and a nonaqueous electrolyte having electrolyte salt in a nonaqueous solvent, and in which the nonaqueous electrolyte contains as an additive a compound expressed by structural formula (I) below, includes charging so that the electric potential of the positive electrode active material is 4.4 to 4.6 V relative to lithium.

[Chemical Formula 9]

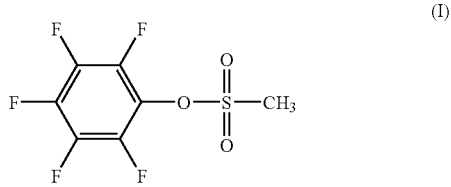

It is preferable that the content of the compound given by structural formula (I) for the nonaqueous electrolyte secondary battery charging method is 0.1% to 2% by mass of the nonaqueous electrolyte.

It is preferable that the positive electrode active material for the nonaqueous electrolyte secondary battery charging method comprises a mixture of a lithium-cobalt composite oxide which is $LiCoO_2$ containing at least both zirconium and magnesium and a lithium-manganese-nickel composite oxide that has a layer structure and contains at least both manganese and nickel.

The present invention further provides the following features. According to the third aspect of the invention, a non-aqueous electrolyte contains a compound expressed by structural formula (I) below. The nonaqueous electrolyte is used in a nonaqueous electrolyte secondary battery which includes a positive electrode that has a positive electrode active material, a negative electrode, and the nonaqueous electrolyte that has electrolyte salt in a nonaqueous solvent, and in which the electric potential of the positive electrode active material is 4.4 to 4.6 V relative to lithium.

[Chemical Formula 10]

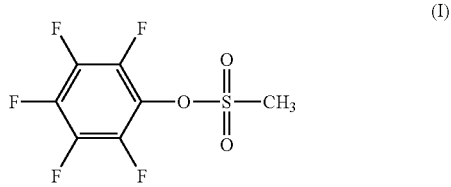

It is preferable that the content of the compound given by structural formula (I) in the nonaqueous electrolyte is 0.1% to 2% by mass of the nonaqueous electrolyte.

It is preferable that the positive electrode active material for the nonaqueous electrolyte comprises a mixture of a lithium-cobalt composite oxide which is $LiCoO_2$ containing at least both zirconium and magnesium and a lithium-manganese-nickel composite oxide that has a layer structure and contains at least both manganese and nickel.

Thanks to having the structures described above, the present invention yields the excellent advantages that will now be described. Namely, in one aspect of the invention, by virtue of its fluorine substituting effects, the compound given by structural formula (I) (expressed as "$C_6F_5OSO_2CH_3$" hereafter) has higher oxidation potential than BP or CHB, with the result that there are unlikely to be any side reactions up to a charging voltage of 4.6 V or so. Further, by virtue of the effects of its methanesulfonyloxy group ($—OSO_2CH_3$), the $C_6F_5OSO_2CH_3$ acts as a negative electrode protecting agent during normal use, thus curbing reactions between the negative electrode and the electrolytic solution. In addition, should the battery be charged to 4.6 V or higher, the $C_6F_5OSO_2CH_3$ will decompose rapidly on the positive electrode, so that the battery can be deactivated before thermorunaway occurs. Thus, according to the first aspect of the invention, a nonaqueous electrolyte secondary battery is obtained that has enhanced overcharging protection properties and moreover is adapted for high charging voltages with an extremely high degree of safety, being capable of being charged so that the potential of the positive electrode active material is 4.4 to 4.6 V relative to lithium.

Preferably in this aspect, the content of the $C_6F_5OSO_2CH_3$ in the nonaqueous electrolyte is in the range 0.1% to 2.0% by mass, which produces particularly good overcharging protection properties. With $C_6F_5OSO_2CH_3$ content less than 0.1% by mass, no overcharging protection properties are produced, while with content exceeding 2.0% by mass, the high-temperature charging/storing characteristics deteriorate, although the overcharging protection properties are good.

Preferably in this aspect, the positive electrode active material comprises a mixture of a lithium-cobalt composite oxide which is $LiCoO_2$ containing at least both zirconium and magnesium and a lithium-manganese-nickel composite oxide that has a layer structure and contains at least both manganese and nickel, which mixture exhibits specifically high thermal stability even in the charged state (highly oxidized state), so that, in conjunction with the presence of the $C_6F_5OSO_2CH_3$, a nonaqueous electrolyte secondary battery can be provided that can be charged with high charging voltage whereby the potential of the positive electrode active material is 4.4 to 4.6 V relative to lithium, and that will be safe even if exposed to an overcharged state resulting from even higher voltage.

Preferably in this aspect, VC has long been in common use as an additive to curb reductive decomposition of organic solvents. Thanks to the addition of VC, a negative electrode surface film (SEI—Solid Electrolyte Interface), also termed a passivation layer, is formed on the negative electrode active material layer prior to the insertion of the lithium into the negative electrode. Since this SEI functions as a barrier that inhibits insertion of the solvent molecules in the surroundings of the lithium ions, the negative electrode active material will not react directly with the organic solvent. As a result, cycling characteristic enhancing effects are produced and a long-life nonaqueous electrolyte secondary battery is obtained. The volume of VC added will be 0.5% to 5% by mass relative to the nonaqueous electrolyte as a whole, preferably 1% to 3% by mass. VC volume of less than 0.5% by mass would produce few cycling characteristic enhancing effects, while VC volume exceeding 5% by mass would lead to a drop in initial capacity and swelling of the battery at high temperature, and is therefore undesirable.

In another aspect of the invention, $C_6F_5OSO_2CH_3$ is present in the nonaqueous electrolyte. Consequently, the nonaqueous electrolyte secondary battery can be charged until the electric potential of the positive electrode active material is 4.4 to 4.6 V relative to lithium, and the battery will be safe even if exposed to an overcharged state resulting from even higher voltage.

Preferably in this aspect, the $C_6F_5OSO_2CH_3$ content is in the range 0.1% to 2.0% by mass of the nonaqueous electrolyte, producing good overcharging protection properties such that charging with high voltage is enabled whereby the potential of the positive electrode active material is 4.4 to 4.6 V relative to lithium, and that the battery will be safe even if exposed to an overcharged state resulting from even higher voltage.

Preferably in this aspect, the positive electrode active material comprises a mixture of a lithium-cobalt composite oxide which is $LiCoO_2$ containing at least both zirconium and magnesium and a lithium-manganese-nickel composite oxide that has a layer structure and contains at least both manganese and nickel, which mixture exhibits specifically high thermal stability even in the charged state (highly oxidized state), so that, in conjunction with the presence of the $C_6F_5OSO_2CH_3$, charging with high voltage is enabled whereby the potential of the positive electrode active material is 4.4 to 4.6 V relative to lithium, and so that the battery will be safe even if exposed to an overcharged state resulting from even higher voltage.

In further another aspect of the invention, $C_6F_5OSO_2CH_3$ is present in the nonaqueous electrolyte, and consequently by using such a nonaqueous electrolyte a nonaqueous electrolyte secondary battery can be provided which can be charged so that the potential of the positive electrode active material is 4.4 to 4.6 V relative to lithium, and which will be safe even if exposed to an overcharged state resulting from even higher voltage.

Preferably in this aspect, the $C_6F_5OSO_2CH_3$ content is in the range 0.1% to 2% by mass of the nonaqueous electrolyte, producing good overcharging protection properties such that by using such a nonaqueous electrolyte, a nonaqueous electrolyte secondary battery can be provided which can be charged with high charging voltage whereby the potential of the positive electrode active material is 4.4 to 4.6 V relative to lithium, and which will be safe even if exposed to an overcharged state resulting from even higher voltage.

Preferably in this aspect, the positive electrode active material comprises a mixture of a lithium-cobalt composite oxide which is $LiCoO_2$ containing at least both zirconium and magnesium and a lithium-manganese-nickel composite oxide that has a layer structure and contains at least both manganese and nickel, which mixture exhibits specifically high thermal stability even in the charged state (highly oxidized state), so that by using such a nonaqueous electrolyte, and in conjunction with the presence of the $C_6F_5OSO_2CH_3$, a nonaqueous electrolyte secondary battery can be provided which can be charged with high charging voltage whereby the potential of the positive electrode active material is 4.4 to 4.6 V relative to lithium, and which will be safe even if exposed to an overcharged state resulting from even higher voltage.

DESCRIPTION OF THE PREFERRED EMBODIMENTS

Figure 1:
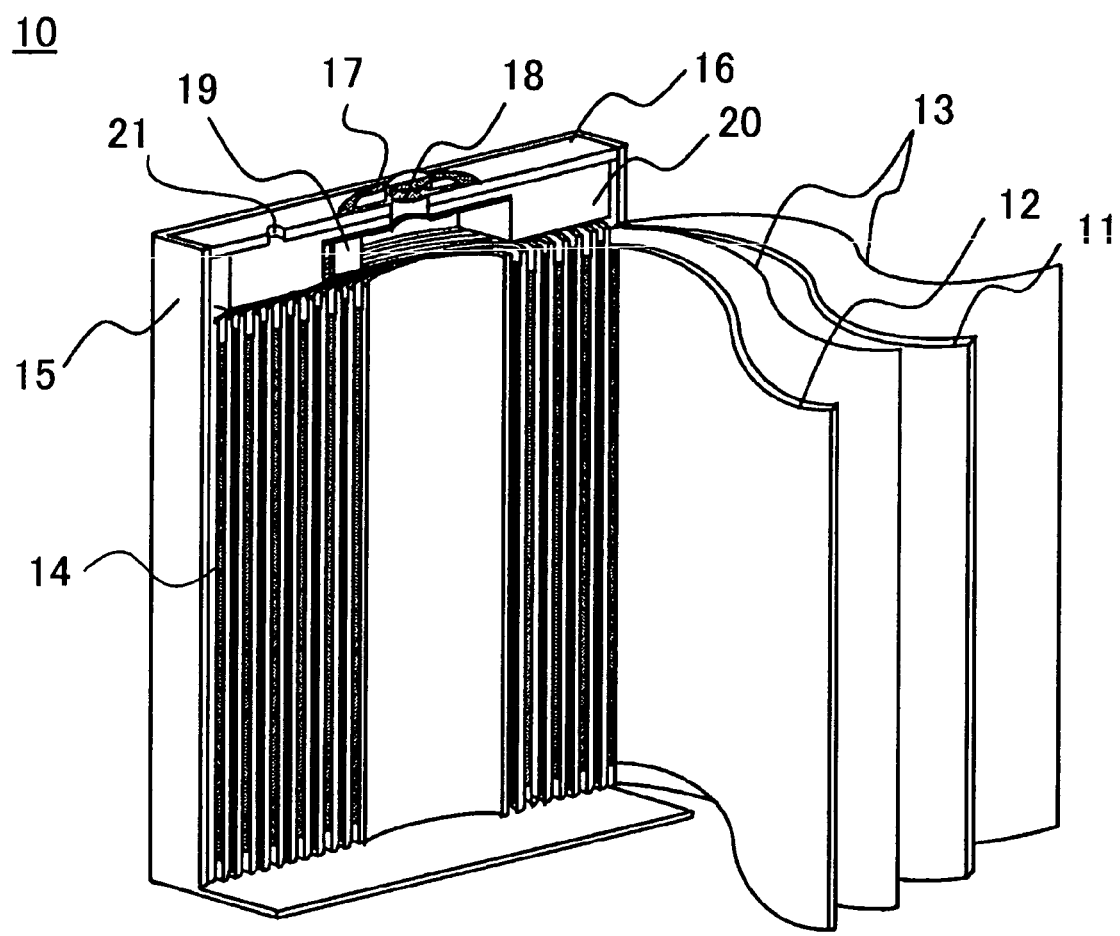
FIG. 1 is a perspective view of a background art square nonaqueous electrolyte secondary battery, cut in the longitudinal direction.

Preferred embodiments for carrying out the invention will now be described in detail, together with comparative cases. It should be understood however that the embodiments below are merely illustrative examples of nonaqueous electrolyte secondary batteries for realizing the technical concepts of the invention. The embodiments are not intended to limit the invention to the secondary batteries here set forth. The invention can equally well be applied in many different variants without departing from the technical concepts set forth in the claims.

First of all will be described the specific methods for fabricating a nonaqueous electrolyte secondary battery that are common to the embodiments and the comparative cases.
Fabrication of Positive Electrode The lithium cobalt oxide with dissimilar elements additives can be fabricated as follows. The initial raw materials used are: lithium carbonate ($Li_2CO_3$) as the lithium source; and as the cobalt source, tricobalt tetroxide ($Co_3O_4$) with added Zr and Mg, which is obtained by adding Zr and Mg as dissimilar elements during synthesis of cobalt carbonate, in the proportions 0.2% by mole and 0.5% by mole respectively relative to the cobalt, then having coprecipitation take place in the resulting aqueous solution and subsequently having the coprecipitate undergo thermal decomposition reactions. These sources are weighed out in particular quantities and mixed together, following which they are calcined at 850° C. for 24 hours in an air atmosphere, yielding lithium cobalt oxide with added Zr and Mg. This is then pulverized in a mortar into grains of average diameter 14 μm, which serves as a positive electrode active material A.

The layered lithium manganese-nickel oxide can be fabricated as follows. The initial raw materials used are $Li_2CO_3$ as the lithium source, and coprecipitated hydroxide, expressed as $Ni_{0.33}Mn_{0.33}Co_{0.34}(OH)_2$, as the transition metal source. These sources are weighed out in particular quantities and mixed together, following which they are calcined at 1000° C. for 20 hours in an air atmosphere, yielding layered lithium manganese-nickel with cobalt content, expressed as $LiMn_{0.33}Ni_{0.33}Co_{0.34}O_2$. This is then pulverized in a mortar into grains of average diameter 5 μm, which serves as a positive electrode active material B.

The positive electrode active material A and positive electrode active material B obtained in the foregoing manner are mixed so as to be in the proportion 7:3 by mass. Then a mixture is prepared in which the positive electrode active material constituted 94 parts by mass, carbon powder to serve as conductant constituted 3 parts by mass, and polyvinylidene fluoride to serve as binder constituted 3 parts by mass. A slurry is then prepared by mixing this with N-methylpyrrolidone. This slurry is then applied, via the doctor blade method, over both sides of a 15 μm-thick positive electrode collector made of aluminum, and dried, thus forming an active material layer on both sides of the positive electrode collector. Afterward, the electrode is pressed using a compress roller, so as to fabricate a positive electrode with short edges 36.5 mm long.
Fabrication of Negative Electrode A slurry is prepared by dispersing in water 95 parts by mass of graphite powder, 3 parts by mass of carboxymethyl cellulose to serve as thickener, and 2 parts by mass of styrene-butadiene rubber to serve as binder. This slurry is then applied, via the doctor blade method, over both sides of a 8 μm-thick negative electrode collector made of copper, and dried, thus forming an active material layer on both sides of the negative electrode collector. Afterward, the electrode is pressed using a compress roller, so as to fabricate a negative electrode with short edges 37.5 mm long. The potential of the graphite is 0.1 V relative to lithium. Hence, for example, where the potential of the positive electrode active material is 4.4 V relative to lithium, the voltage of a battery using the graphite as its negative electrode will be 4.3 V.

Here, the active material quantities for application in the positive electrode and negative electrode can be determined as follows. The per-gram charging capacity of the positive electrode active material at the design standard charging voltage is gauged with a 3-electrode cell (having a counter electrode of lithium metal and a reference electrode of lithium metal), and on the basis of this datum and the theoretical charging capacity of the graphite negative electrode, the materials are prepared in quantities such that the charging capacity ratio (negative electrode charging capacity/positive electrode charging capacity) would be 1.1. The charging capacity of the positive electrode active material will vary with the charging voltage, Table 1 gives example values for charged positive electrode potential versus positive electrode capacity in the case of lithium cobalt oxide with added Zr and Mg, plus layered lithium manganese-nickel oxide (mixed in the ratio 7:3.)

TABLE 1

| Charged positive electrode potential (relative to Li/Li+) | Positive electrode charging capacity (mAh/g) |
|---|---|
| 4.3 V | 166 |
| 4.4 V | 182 |
| 4.5 V | 200 |
| 4.6 V | 230 |
| 4.7 V | 240 |

Preparation of Electrolyte

Five varieties of electrolyte are prepared, which had the following overcharging protection additives and content thereof: zero additive (first comparative case); CHB at 2.0% by mass (second comparative case); and $C_6F_5OSO_2CH_3$ at 0.1% by mass (first embodiment), 2.0% by mass (second embodiment) and 3.0% by mass (third embodiment). In each case a solvent mixture made up of 20% EC, 50% MEC and 30% DEC by volume is prepared, and $LiPF_6$ is dissolved therein so as to constitute 1 mol/L. Then, for the cases where an additive for overcharging protection is to be added, such additive is added so as to constitute a particular content proportion of the electrolyte's total mass.

Fabrication of Battery

Using the foregoing positive electrode, negative electrode and nonaqueous electrolyte, together with porous films made of polyethylene as separators, five varieties of square nonaqueous electrolyte secondary battery (5 mm×34 mm×43 mm), constituting first to third embodiments and first and second comparative cases can be fabricated.

Measurement of Charging-Discharging Cycling Characteristics

Here, charging-discharging cycling tests under the charging-discharging conditions set forth below were conducted for each of the battery varieties fabricated as described above. All of the charging-discharging cycling tests were conducted in a thermostatic oven maintained at 25° C., and all of the voltage values were voltages relative to lithium. First of all, each battery was charged with constant current of 1 It (1 C) until the battery voltage reached 4.4 V, then charged with constant voltage of 4.4 V until the current level became 1/50 It, then discharged at constant current of 1 It until the battery voltage reached 3.0 V. The discharge capacity at that point was determined and the initial capacity. For measurement of the charging-discharging cycling characteristics, one cycle was taken to equal charging with constant current of 1 It until the battery voltage reached 4.4 V, followed by charging with constant voltage of 4.4 V until the current level became 1/50 It, followed by discharging at constant current of 1 It until the battery voltage reached 3.0 V. After the initial capacities had been determined, each of the batteries was put through 300 cycles consecutively and the discharge capacity after 300 cycles was determined. Then the calculation equation below was used to determine for each battery the remaining capacity percentage after 300 cycles at 25° C., which was taken as the cycling characteristic value. The results are gathered in Table 2.

Remaining capacity percentage=(discharge capacity after 300 cycles/initial capacity)×100

Overcharging Test

Constant current charging was implemented at 25° C. with charging current of 415 mA until the battery voltage reached 12 V, and changes in the battery were observed. The following criteria were used for observation of battery change:

LEVEL 1: No abnormality (no leakage of electrolyte)
LEVEL 2: No abnormality (some leakage of electrolyte)
LEVEL 3: Smoke emission
LEVEL 4: Ignition
LEVEL 5: Rupture For safety's sake, the pass level for the test was taken to be LEVEL 1 or LEVEL 2. The results are gathered in Table 2, where ⊚ indicates LEVEL 1 and ○ indicates LEVEL 2.

High-Temperature Storage Test

After being charged at 25° C. with constant current of 1 It until the battery voltage reached 4.4 V, then being charged with constant voltage of 4.4 V until the current level became 1/50 It, each battery was left in a thermostatic oven at 80° C. for 48 hours, then cooled to 25° C., whereupon the battery thickness was measured with a micrometer. The results are gathered in Table 2.

TABLE 2

| | Comparative case 1 | Comparative case 2 | Embodiment 1 | Embodiment 2 | Embodiment 3 |
|---|---|---|---|---|---|
| Additive | None | CHB | $C_6F_5OSO_2CH_3$ | $C_6F_5OSO_2CH_3$ | $C_6F_5OSO_2CH_3$ |
| Quantity added (by mass) | None | 2.0% | 0.1% | 2.0% | 3.0% |
| Cycling capacity maintenance rate (300 cycles) | 80% | 60% | 84% | 84% | 83% |
| Overcharging test | ○ | ⊚ | ⊚ | ⊚ | ⊚ |
| Battery thickness change after prolonged high temperature | 6 mm or less | 6 mm or less | 6 mm or less | 6 mm or less | Over 6 mm |

⊚: no abnormality (no leakage of electrolyte)
○: no abnormality (some leakage of electrolyte)
CHB: cyclohexylbenzene The results set forth in Table 2 make clear the following. With the battery of the first comparative case where no overcharging prevention additive is added: the capacity maintenance rate after 300 cycles is a satisfactory 80%; the overcharging test results show that although leakage of electrolyte was observed, there is no smoke emission or ignition, so that the battery qualifies as satisfactory in terms of safety measures; and good properties are exhibited after prolonged high temperature, with no more than a 6 mm change in the battery thickness. By contrast, with the battery of the second comparative case, which represents the related art addition of the overcharging prevention additive CHB at 2.0% by mass: although no abnormality is observed in the overcharging test results and the battery exhibits good properties after prolonged high temperature, with no more than a 6 mm change in the battery thickness, the capacity maintenance rate after 300 cycles is markedly lower at 60%. This lower capacity maintenance rate seems to occur because during normal use in a nonaqueous electrolyte secondary battery which is charged with high voltage of 4.4 to 4.6 V relative to lithium, such as in the present invention, the CHB that is used as overcharging prevention additive in the related art case decomposes and gives rise to side reactions.

On the other hand, with the first to third embodiments, where $C_6F_5OSO_2CH_3$, the overcharging prevention additive of the present invention, is added, the capacity maintenance rate after 300 cycles is 83 to 84% in each case, exerting superior effects, and the overcharging test results are extremely good, with no change whatever occurring. Nevertheless, the battery thickness change after prolonged high temperature is over 6 mm, with large amounts of gas being generated in the battery interior, when $C_6F_5OSO_2CH_3$ is added in a quantity of 3.0% by mass although no more than 6 mm with $C_6F_5OSO_2CH_3$ added in a quantity of no more than 2% by mass. Therefore, safety can be maintained to a roughly adequate degree if the quantity of $C_6F_5OSO_2CH_3$ added is in the range 0.1% to 3.0% by mass, but in consideration of the battery thickness change after prolonged high temperature, the quantity of $C_6F_5OSO_2CH_3$ added will preferably be in the range 0.1% to 2% by mass. With $C_6F_5OSO_2CH_3$ added in quantities less than 0.1% by mass, essentially none of the advantageous effects of $C_6F_5OSO_2CH_3$ addition is observed, and the results obtained are similar to those with the first comparative case where no overcharging prevention additive is added.

The invention claimed is:

1. A nonaqueous electrolyte secondary battery comprising:
   a positive electrode that has a positive electrode active material;
   a negative electrode; and
   a nonaqueous electrolyte that has electrolyte salt in a nonaqueous solvent;
   the electric potential of said positive electrode active material being 4.4 to 4.6 V relative to lithium, and
   said nonaqueous electrolyte containing
       a compound given by structural formula (I) below in a content of 0.1% to 2% by mass of said nonaqueous electrolyte,
       methyl ethyl carbonate content of 30% to 80% by volume, and
       $LiPF_6$ content of 1.0 mol/L to 2.0 mol/L in said nonaqueous solvent,
   and said positive electrode active material comprises a mixture of a lithium-cobalt composite oxide which is $LiCoO_2$ containing at least both zirconium and magnesium and a lithium-manganese-nickel composite oxide that has a layer structure and contains at least both manganese and nickel.

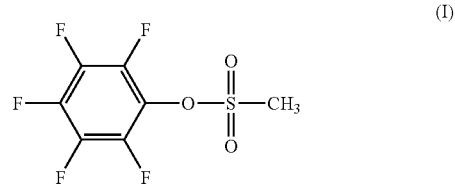

(I)

2. The nonaqueous electrolyte secondary battery according to claim 1, wherein said nonaqueous electrolyte further contains vinylene carbonate.

3. The nonaqueous electrolyte secondary battery according to claim 1, wherein the compound given by structural formula (I) decomposes to deactivate the battery when the battery charged to higher than 4.6 V.

4. A method for charging a nonaqueous electrolyte secondary battery including:
   a positive electrode having a positive electrode active material;
   a negative electrode; and
   a nonaqueous electrolyte with electrolyte salt contained in a nonaqueous solvent;
   said nonaqueous electrolyte containing as an additive
       a compound given by structural formula (I) below in a content of 0.1% to 2% by mass of said nonaqueous electrolyte,
       methyl ethyl carbonate content of 30% to 80% by volume, and
       $LiPF_6$ content of 1.0 mol/L to 2.0 mol/L in said nonaqueous solvent,
   said positive electrode active material comprises a mixture of a lithium-cobalt composite oxide which is $LiCoO_2$ containing at least both zirconium and magnesium and a lithium-manganese-nickel composite oxide that has a layer structure and contains at least both manganese and nickel
   said method comprising:
   charging so that the electric potential of said positive electrode active material is 4.4 to 4.6 V relative to lithium.

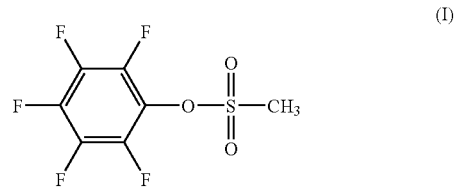

(I)

5. The method for charging a nonaqueous electrolyte secondary battery according to claim 4, wherein the content of said compound given by said structural formula (I) is 0.1% to 2% by mass of said nonaqueous electrolyte.

* * * * *